(12) United States Patent
Hackert et al.

(10) Patent No.: US 12,509,384 B2
(45) Date of Patent: Dec. 30, 2025

(54) SUBSTRATE PROCESSING STATION FOR LASER-BASED MACHINING OF SHEET-LIKE GLASS SUBSTRATES

(71) Applicant: Corning Incorporated, Corning, NY (US)

(72) Inventors: Thomas Hackert, Jahnsdorf (DE); Frank Fabian Herrnberger, Munich (DE); Michael Klein, Gilching (DE); Albert Roth Nieber, Painted Post, NY (US); Florian Spaeth, Eching (DE); Marco Andre Wolfert, Munich (DE)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/078,177

(22) Filed: Dec. 9, 2022

(65) Prior Publication Data
US 2023/0108711 A1 Apr. 6, 2023

Related U.S. Application Data

(62) Division of application No. 15/791,774, filed on Oct. 24, 2017, now Pat. No. 11,542,190.
(Continued)

(51) Int. Cl.
*C03B 33/037* (2006.01)
*B23K 26/046* (2014.01)
(Continued)

(52) U.S. Cl.
CPC .......... *C03B 33/037* (2013.01); *B23K 26/046* (2013.01); *B23K 26/0838* (2013.01);
(Continued)

(58) Field of Classification Search
None
See application file for complete search history.

(56) References Cited

U.S. PATENT DOCUMENTS

| 2007/0044606 A1 | 3/2007 | Kang et al. |
|---|---|---|
| 2008/0190981 A1 | 8/2008 | Okajima et al. |

(Continued)

FOREIGN PATENT DOCUMENTS

| CN | 1259924 A | 7/2000 |
|---|---|---|
| CN | 1809512 B | 7/2006 |

(Continued)

OTHER PUBLICATIONS

Chinese First Office action for Application No. 201780065972.0, dated Jun. 2, 2021, 9 pages.
(Continued)

*Primary Examiner* — Queenie S Dehghan
(74) *Attorney, Agent, or Firm* — Womble Bond Dickinson (US) LLP

(57) ABSTRACT

A glass sheet processing apparatus includes a first gantry assembly that extends across a glass sheet in a cross-machine direction. The first gantry assembly includes a processing head that moves along a length of the first gantry assembly and includes a laser comprising an optical arrangement positioned in a beam path of the laser providing a laser beam focal line that is formed on a beam output side of the optical arrangement. A second gantry assembly extends across the glass sheet in the cross-machine direction. The second gantry assembly includes a processing head that moves along a length of the second gantry assembly.

13 Claims, 14 Drawing Sheets

Related U.S. Application Data

(60) Provisional application No. 62/411,938, filed on Oct. 24, 2016.

(51) Int. Cl.

| | | |
|---|---|---|
| *B23K 26/08* | (2014.01) | |
| *B23K 26/38* | (2014.01) | |
| *B23K 26/402* | (2014.01) | |
| *B65G 49/06* | (2006.01) | |
| *C03B 33/02* | (2006.01) | |
| *C03B 33/03* | (2006.01) | |

(52) U.S. Cl.
CPC .......... *B23K 26/0876* (2013.01); *B23K 26/38* (2013.01); *B23K 26/402* (2013.01); *B65G 49/064* (2013.01); *C03B 33/0222* (2013.01); *C03B 33/03* (2013.01); *B65G 2249/04* (2013.01)

(56) References Cited

U.S. PATENT DOCUMENTS

| | | | |
|---|---|---|---|
| 2009/0212033 A1* | 8/2009 | Beck | B23K 26/38 219/121.72 |
| 2010/0024865 A1 | 2/2010 | Shah et al. | |
| 2011/0017716 A1* | 1/2011 | Rumsby | H05K 3/0026 219/121.72 |
| 2012/0061440 A1* | 3/2012 | Roell | C03B 33/03 225/2 |
| 2013/0078891 A1 | 3/2013 | Lee et al. | |
| 2013/0222878 A1 | 8/2013 | Greer et al. | |
| 2014/0199519 A1* | 7/2014 | Schillinger | B23K 26/53 219/121.75 |
| 2015/0166395 A1* | 6/2015 | Marjanovic | B23K 26/384 428/131 |
| 2016/0008927 A1 | 1/2016 | Grundmueller et al. | |
| 2016/0009585 A1 | 1/2016 | Bookbinder et al. | |
| 2018/0057390 A1* | 3/2018 | Hackert | C03C 3/093 |
| 2018/0111870 A1 | 4/2018 | Herrnberger et al. | |

FOREIGN PATENT DOCUMENTS

| | | |
|---|---|---|
| CN | 1890074 A | 1/2007 |
| CN | 1920632 A | 2/2007 |
| CN | 100999320 A | 7/2007 |
| CN | 101031383 A | 9/2007 |
| CN | 101622722 A | 1/2010 |
| CN | 101980982 B | 2/2011 |
| CN | 102105256 B | 6/2011 |
| CN | 103347827 A | 10/2013 |
| CN | 103817434 A | 5/2014 |
| CN | 104108870 A | 10/2014 |
| CN | 204211638 U | 3/2015 |
| CN | 105209218 B | 12/2015 |
| CN | 205328860 U | 6/2016 |
| CN | 106007349 A | 10/2016 |
| EP | 0390013 A2 * | 10/1990 .......... H01S 3/0818 |
| JP | S63192561 A | 8/1988 |
| JP | H11347861 A | 12/1999 |
| JP | 2001130921 A | 5/2001 |
| JP | 2008132616 A | 6/2008 |
| JP | 2009126779 A | 6/2009 |
| JP | 2011512259 A | 4/2011 |
| JP | 2012528772 A | 11/2012 |
| JP | 2014097531 A | 5/2014 |
| JP | 2015-508189 A | 3/2015 |
| JP | 2016-520501 A | 7/2016 |
| WO | 2009119694 A1 | 10/2009 |
| WO | 2015/050762 A | 4/2015 |
| WO | 2016007843 A1 | 1/2016 |
| WO | 2016010991 A1 | 1/2016 |
| WO | 2017091529 A1 | 6/2017 |
| WO | 2018081031 A1 | 5/2018 |

OTHER PUBLICATIONS

Chinese Second Office action for Application No. 201780065972.0, dated Dec. 14, 2021, 9 pages.
Chinese Third Office action for Application No. 201780065972.0, dated Feb. 28, 2022, 10 pages.
European Search Report for Application No. 20 20 7645, dated Jun. 4, 2021, 1 page.
Dakkanobu M, et al., Cutting line processing apparatus for glass plate used in flat panel display (FPD) e.g. LCD, has cutter heads attached to sliders which are moved by driving force of feed-screw apparatuses corresponding to cutting line, WPI / 2017 Clarivate Analytics, vol. 2009, Nr:66.
Fuji, M., Slicing method of brittle substrate like glass, semiconductor wafer, involves forming blind crack on surface by laser irradiation, and irradiating laser further to accelerate crack till substrate breaks, WPI / 2017 Clarivate Analytics, May 15, 2001, vol. 2002, Nr.: 19.
International Search Report for PCT/US2017/057950, dated Feb. 2, 2018, 4 pages.
Japanese Office action for Application No. 2019-521647, dated Mar. 22, 2022, 2 pages.
Korean Office action for Application No. 10-2019-7014771, dated Jul. 20, 2022, 2 pages.

* cited by examiner

SUBSTRATE PROCESSING STATION FOR LASER-BASED MACHINING OF SHEET-LIKE GLASS SUBSTRATES

This application is a division of U.S. patent application Ser. No. 15/791,774, filed on Oct. 24, 2017, which claims the benefit of priority under 35 U.S.C. § 119 of U.S. Provisional Application Ser. No. 62/411,938, filed on Oct. 24, 2016, the content of which is relied upon and incorporated herein by reference in their entirety.

FIELD

This disclosure relates to methods and apparatuses for machining sheet-like substrates and, more particularly, to substrate processing stations for laser-based machining of sheet-like glass substrates.

BACKGROUND

Various methods and apparatuses for severing glass sheets are known. One illustrative method employs lasers, which by virtue of wavelength and power that are strongly absorbed by the glass material, or after the first interaction make the material strongly absorbent, can then ablate the material. Another method is a specifically directed, laser-induced crack formation in which a trace on the surface is first strongly heated by the laser and immediately thereafter, this trace is cooled quickly (e.g., by a water jet) such that the thermal stresses thereby achieved lead to crack formation, which may be propagated through the thickness of the material (mechanical stress) in order to sever the material.

In some known cutting processes, a glass cutting apparatus including X/Y (sometimes referred to as 2D) positioning tables may be used. For example, a carrier may be used to transport the glass sheet between processing locations. The X/Y positioning table of the glass cutting apparatus may be mounted with the carrier and the glass sheet located thereon. The carrier may then by moved by linear actuators in both X and Y directions in a horizontal plane while a stationary process head including a laser directs a laser beam onto the glass sheet for the cutting operation.

While the above-described process may be suitable for cutting the glass sheet, the handling of the individual glass sheets on carriers can be time-consuming and can be less suitable for higher volume operations. The scrap from the cutting operation typically remains on the carriers thereby introducing another step where the scrap must be removed from the carrier.

SUMMARY

An object of the present invention is therefore to provide a method (and a corresponding device) with which sheet-like substrates, in particular of brittle materials, can be machined, in particular completely severed, without significant particle formation, without significant melt edges, with minimal crack formation at the edge, without significant cutting gaps (that is to say material losses), with straightest-possible cut edges and with a high speed of the process.

In one embodiment, a glass sheet processing apparatus includes a first gantry assembly that extends across a glass sheet in a cross-machine direction. The first gantry assembly includes a processing head that moves along a length of the first gantry assembly and includes a laser comprising an optical arrangement positioned in a beam path of the laser providing a laser beam focal line that is formed on a beam output side of the optical arrangement. A second gantry assembly extends across the glass sheet in the cross-machine direction. The second gantry assembly includes a processing head that moves along a length of the second gantry assembly.

In another embodiment, a method for laser-based machining of a sheet-like substrate, in order to separate the substrate into multiple portions, in which the laser beam of a laser for machining the substrate is directed onto the substrate is provided. The method includes processing the sheet-like substrate using a first gantry assembly that extends across the sheet-like substrate in a cross-machine direction. The first gantry assembly includes a processing head that moves along a length of the first gantry assembly and includes a laser including an optical arrangement positioned in a beam path of the laser providing a laser beam focal line that is formed on a beam output side of the optical arrangement. The sheet-like substrate is processed using a second gantry assembly that extends across the sheet-like substrate in the cross-machine direction. The second gantry assembly includes a processing head that moves along a length of the second gantry assembly.

In another embodiment, a glass sheet processing apparatus includes a gantry assembly that extends across a glass sheet in a cross-machine direction. The gantry assembly includes multiple processing heads that move along a length of the gantry assembly in the cross-machine direction. A first processing head includes a laser that separates the glass sheet into multiple portions including an optical arrangement positioned in a beam path of the laser providing a laser beam focal line that is formed on a beam output side of the optical arrangement.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments described herein relate generally to glass sheet transfer apparatuses suitable for use with laser-based machining of sheet-like glass substrates. The glass sheet transfer apparatuses may be part of a glass sheet processing apparatus that generally includes one or more of a glass sheet loading station that is used to load the glass sheets into the glass sheet processing apparatus, a glass sheet centering station that is used to position the glass sheet in the cross-machine direction, a glass sheet processing station where cutting tools (e.g., lasers) are used in cutting the glass sheet, a glass unloading station where desired parts are removed from the undesired scrap and a glass waste disposal station where remaining glass scrap is processed to reduce the size of the undesired scrap and deposit the crushed scrap in a holding location.

Figure 1:
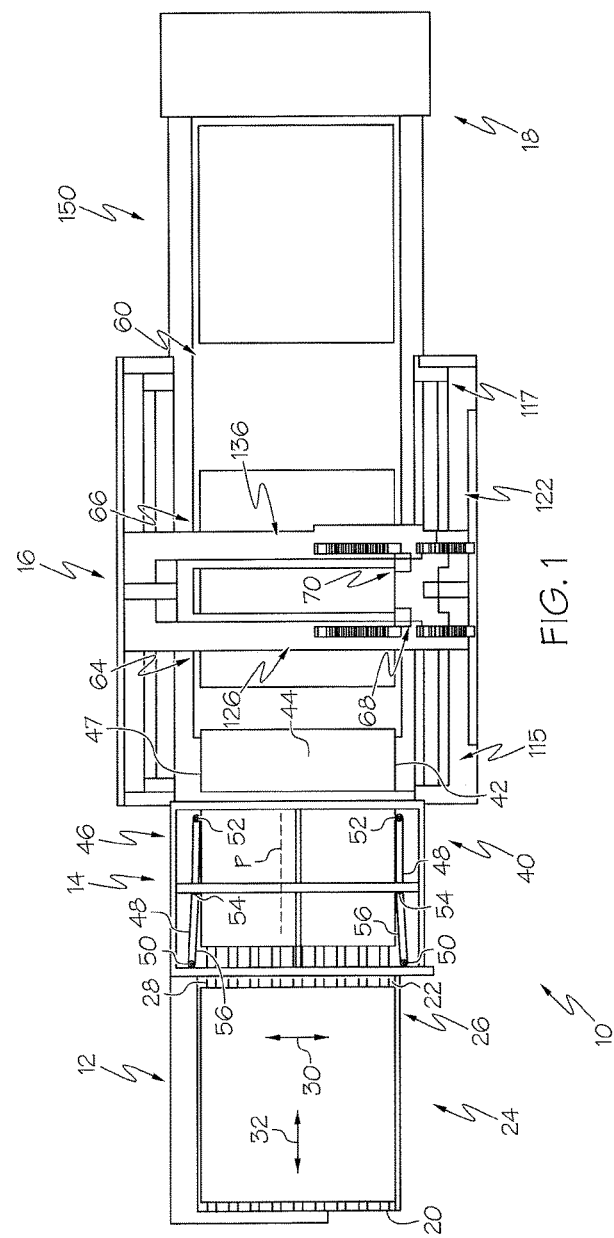
FIG. 1 illustrates diagrammatic plan view of a glass sheet processing apparatus suitable for use with laser-based machining of sheet-like substrates, according to one or more embodiments shown and described herein.

Referring to FIG. 1, a glass sheet processing apparatus 10 according to one or more embodiments is shown. The glass sheet processing apparatus 10 includes a glass sheet loading station 12, a glass sheet centering station 14, a glass sheet processing station 16 and a glass waste disposal station 18. The glass sheet loading station 12 is of a tilting table configuration having an infeed end 20 and an outfeed end 22. The glass sheet loading station 12 may include a table support body 24 that includes an array 26 of conveyor belts 28 that together define a support surface for a glass sheet 44 supported thereon. The conveyor belts 28 may be spaced apart in the cross-machine direction (indicated by arrow 30) any distance that is suitable to transport the glass sheets, yet inhibit contact between adjacent belts 28 during use.

The table support body 24 may have a loading configuration and a transfer configuration. In the loading configuration, the infeed end 20 of the table support body 24 can be lowered (e.g., closer to a floor or other infeed device) using an actuator (e.g., a pneumatic actuator, motor, etc.) where a glass sheet can be readily fed onto the support surface that is defined by the conveyor belts 28. The conveyor belts 28 may be used to pull the glass sheet onto the table support body 24 through their movement in the machine direction (indicated by arrow 32) at a predetermined velocity. Once the glass sheet 14 is on the table support body 24, the infeed end 20 may be raised such that the infeed end 20 and the outfeed end 22 are at substantially the same elevation and the support surface is substantially horizontal for feeding the glass sheet from the glass sheet loading station 12 to the glass sheet centering station 14 using the conveyor belts 28. In some embodiments, the infeed end 20 may remain substantially horizontal throughout the glass sheet infeed process and may not be lowered and raised.

In the illustrated embodiment, the glass sheet centering station 12 may include a first side position adjustment mechanism 40 located at one side edge 42 of glass sheet 44 and a second side position adjustment mechanism 46 located at an opposite side edge 47 of the glass sheet 44. The first and second side position adjustment mechanisms 40 and 46 include an adjustment belt 48 that is trained about end drive rollers 50 and 52 and a central belt positioning roller 54. The central belt positioning rollers 54 are located inboard toward a centerline of the drive path P from the upstream end drive rollers 20, which creates a tapered region 56 of the first and second side position adjustment regions 40 and 46. The tapered regions 56 decrease the available width of the drive path P, which can adjust the cross-machine location of the glass sheet 44 to a desired location right before the glass sheet 44 is received by a glass holding conveyor belt 60 for laser processing.

The glass holding conveyor belt 60 can carry the glass sheet 44 through the glass sheet processing station 16. The glass sheet processing station 16 may be a multi-gantry type including at least two gantry assemblies 64 and 66 that are arranged substantially parallel to each other, extending in the cross-machine direction. The gantry assemblies 64 and 66 may be controlled by a controller to move independently along the glass sheet processing station 16 in the machine direction 32. Movement of the gantry assemblies 64 and 66 may be dictated by dimensions and numbers of the parts being machined from the glass sheet 44. As will be described in greater detail below, each gantry assembly 64 and 66 may include one or more processing head 68 and 70 that are moveable linearly in the cross-machine direction 30 and each include a respective laser cutting device that can be used to sever sections of the glass sheet 44 from another. The linear movement of the gantry assemblies 64 and 66 in the machine direction 32 and the linear movement of the processing heads 68 and 70 in the cross-machine direction 30 allow for cutting the glass sheet 44 into various complex and non-complex shapes, depending on the needs of the end product. Further the processing heads 68 and 70 may work together for cutting through the glass sheet 44 in a multi-stage cutting process.

Figure 2:
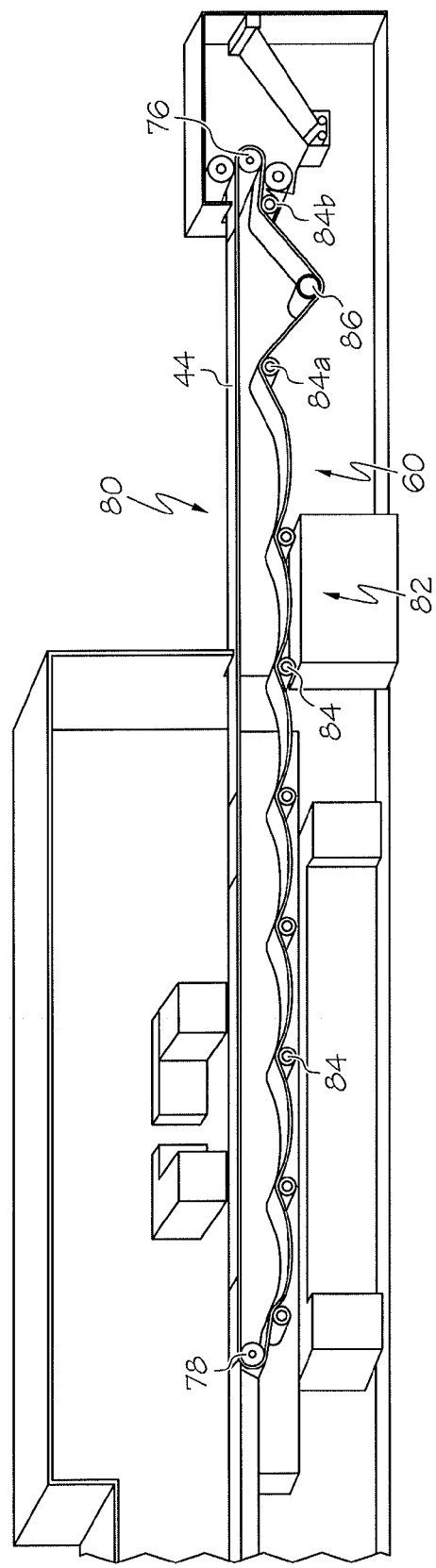
FIG. 2 illustrates a side section view of the glass sheet processing apparatus of FIG. 1.

Referring to FIG. 2, the glass holding conveyor belt 60 extends between a downstream drive roller 76 and an upstream drive roller 78 in a continuous loop defining a conveying portion 80 that conveys the glass sheets 44 downstream and a return portion 82 that travels toward the upstream drive roller 78. As illustrated by FIG. 2, the glass holding conveyor belt 60 is held relatively taught at the conveying portion 80 to provide a substantially flat support surface for the glass sheets 44. This is compared to the return portion 82, which is held relatively slack, allowing the return portion 82 to rest upon idle support rollers 84 as the return portion 82 of the glass holding conveyor belt 60 travels toward the upstream drive roller 78. A tension roller 86 may be provided between idle support rollers 84a and 84b immediately adjacent the downstream drive roller 76 to maintain a consistent tension for the glass holding conveyor belt 60 to exit the conveying portion 80 into the return portion 82, about the downstream drive roller 76. The downstream drive roller 76 and upstream drive roller 78 may each be connected to a motor to drive the glass holding conveyor belt 60 in a continuous fashion. In some embodiments, only the downstream drive roller 76 may be driven by a motor.

Figure 3:
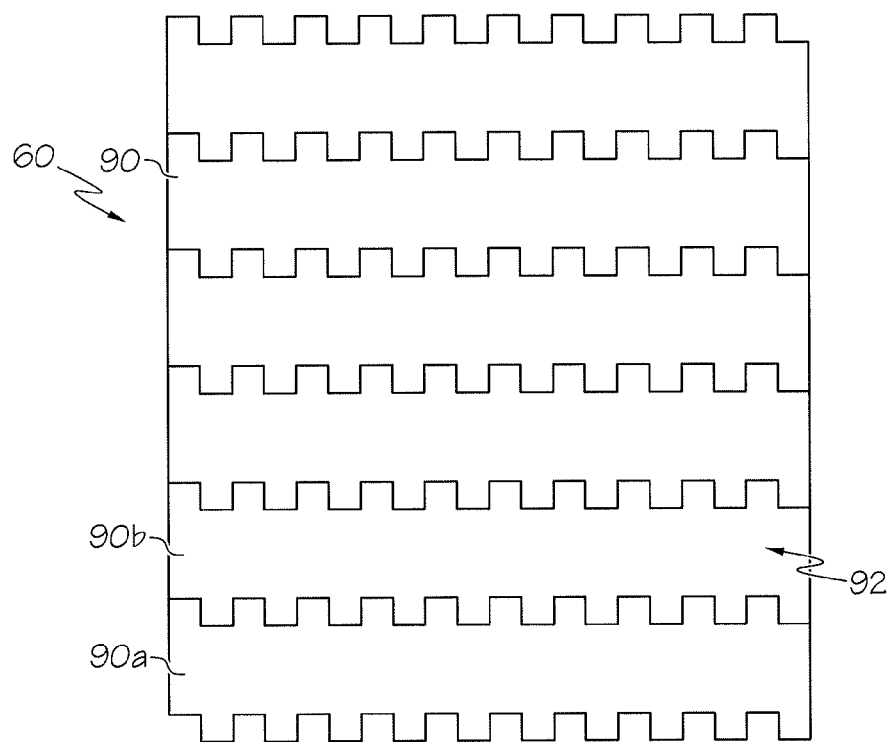
FIG. 3 illustrates a portion of a glass holding conveyor belt for use with the glass sheet processing apparatus of FIG. 1, according to one or more embodiments shown and described herein.
Figure 4:
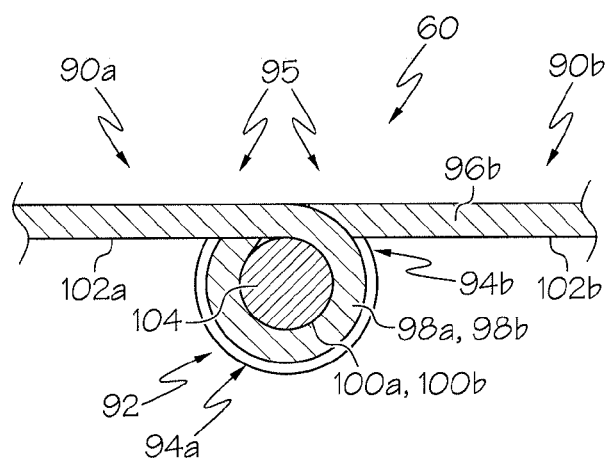
FIG. 4 illustrates another view of the glass holding conveyor belt along line 4-4 of FIG. 3.
Figure 5:
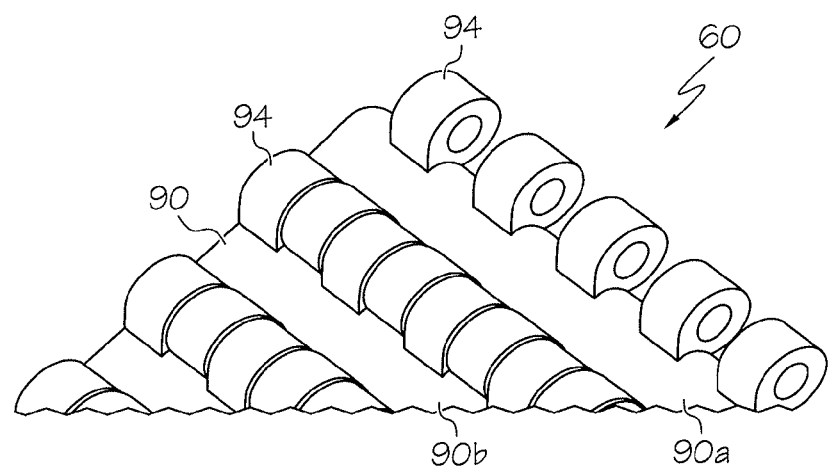
FIG. 5 illustrates another view of the glass holding conveyor belt of FIG. 3.

Referring to FIG. 3, a portion of the glass holding conveyor belt 60 is shown and includes conveyor belt segments 90 that are interconnected to provide the continuous glass holding conveyor belt 60. The conveyor belt segments 90a and 90b may be connected along joint lines 92 that allow for articulating (e.g., rotating) movement between the conveyor belt segments 90a and 90b relative to one another. Referring briefly to FIG. 4, conveyor belt segment 90a may include interlocking members 94a in the form of integrally formed loop members that extend outwardly from a substantially planar support portion 96a and form a loop portion 98a with an opening 100a by extending back toward an underside 102a of the conveyor belt segment 90a. Likewise, the conveyor belt segment 90b may include interlocking members 94b in the form of integrally formed loop members that extend outwardly from a substantially planar support portion 96b and form a loop portion 98b with an opening 100b by extending back toward an underside 102b of the conveyor belt segment 90b. The interlocking members 94a and 94b may engage in a side-by-side arrangement with their openings 100a and 100b aligned and sized to receive a connecting rod 104 therethrough, which allows movement of the conveyor belt segments 90a and 90b in the direction of arrow 95 while inhibiting separation of the conveyor belt segments 90a and 90b. As shown by FIG. 5, a number of the interlocking members 94 of adjacent conveyor belt segments 90 are positioned side by side in a row to receive the connecting rod 104 in a rotatable fashion. Each conveyor belt segment 90 may be connected in the same fashion providing the glass holding conveyor belt 60 with a relatively high degree of articulation and ability to remove/replace sections of the glass holding conveyor belt.

Figure 6:
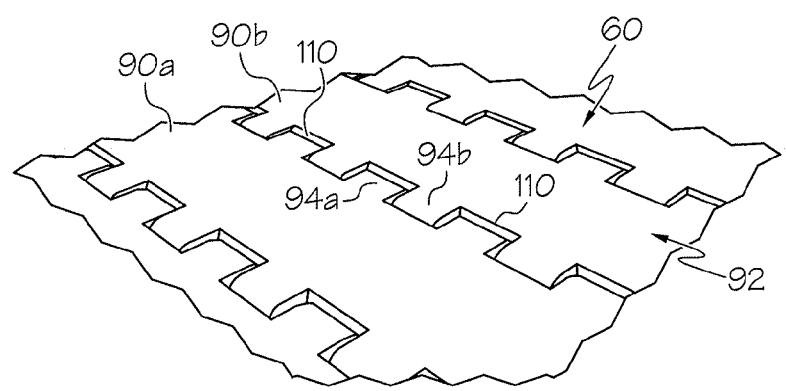
FIG. 6 illustrates another view of the glass holding conveyor belt of FIG. 3.

Referring to FIG. 6, a series of vacuum openings 110 are provided along each joint line 92 due to the interconnections between and sizes of the interlocking members 94a and 94b. The vacuum openings 110 are provided through the thickness of the glass holding conveyor belt 60 and follow an air flow path through the interconnections between the interlocking members 94a and 94b to allow negative pressure generated below the glass holding conveyer belt 60 to draw air through the vacuum openings 110. In some embodiments, a negative pressure of up to 280 millibar or more may be generated. This negative pressure may be used to hold the glass sheets 44 against the glass holding conveyor belt 60 and inhibit movement of the glass sheets 44 as they travel in the machine direction 32.

The glass holding conveyor belt 60 may be formed of any material that is suitable for contacting the high-quality glass sheets 44. As one example, polyoxymethylene C (POM C) may be used due to its suitability to contact the glass sheets 44 and thermal resistance during the laser cutting process. The natural color of POM C (no added color ingredients) is white, which reduces any interference with the laser and can reduce the amount of process residue on the parts produced from the glass sheets 44. POM C can also be suitable for a wide range of laser processes.

Figure 7:
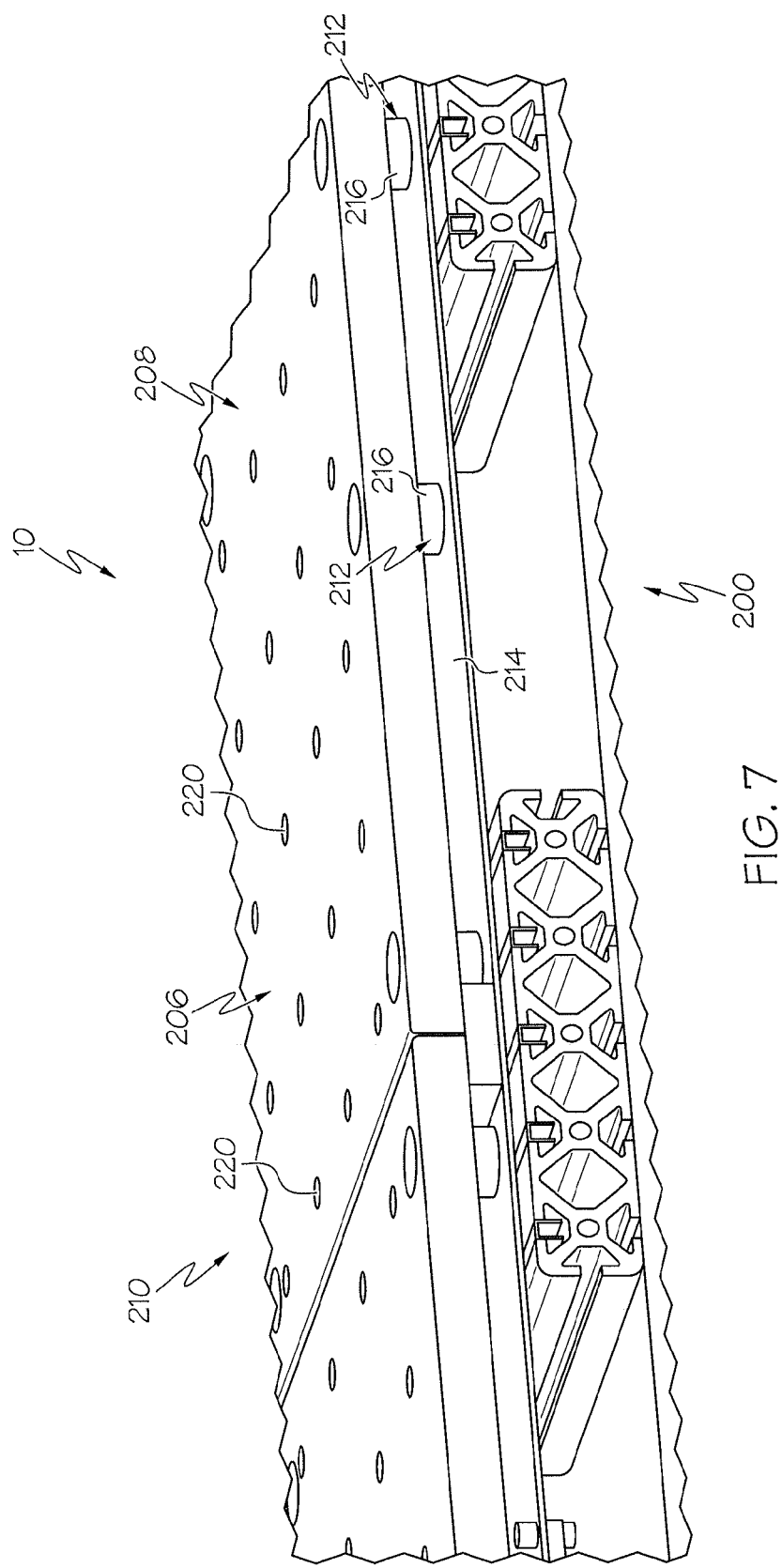
FIG. 7 is a section view of the glass sheet processing apparatus of FIG. 1 with a glass holding conveyor belt removed, according to one or more embodiments shown and described herein.

Referring to FIG. 7, a section view of the glass sheet processing apparatus 10 is illustrated with the glass holding conveyor belt 60 removed for clarity. The glass holding conveyor belt is supported by a vacuum support apparatus 200. The vacuum support apparatus 200 supports the glass holding conveyor belt 60 against a conveyor support surface 206 as the glass holding conveyor belt 60 is being conveyed. The conveyor support surface 206 is provided by a plurality of worktable support sections 208 that are aligned together in both the machine longitudinal and machine lateral directions to define a substantially planar worktable assembly 210 that includes the conveyor support surface 206 arranged substantially horizontally. The individual worktable support sections 208 may be formed as plates that, in the illustrated embodiment, are rectangular, but may be any suitable shape that are shaped to fit together in a side-by-side arrangement.

The worktable support sections 208 may be aligned both vertically and horizontally using height adjustment spacer assemblies 212. The height adjustment spacer assemblies 212 may include spacer members 216 that are positioned between an individual worktable support section 208 and a vacuum chamber floor 214. The spacer members 216 may be substantially the same height to align the worktable support sections 208 vertically to provide the substantially planar conveyor support surface 206. The height adjustment spacer assemblies 212 may also provide a vacuum chamber volume 218 that is provided between the vacuum chamber floor 214 and the worktable assembly 210.

Each worktable support section 208, while used to support the glass holding conveyor belt 60 as the glass holding conveyor belt 60 moves relative to the worktable support assembly 210, also facilitates application of a negative pressure along lengths of the glass holding conveyor belt 60. In particular, the worktable support sections 208 include vacuum openings 220 that are provided through thicknesses of the worktable support sections 208. In some embodiments, the vacuum openings 220 of each worktable support section 208 may be aligned in both rows and columns to provide an array of the vacuum openings 220 that is spread across areas of the conveyor support surface 206. The vacuum openings 220 provide communication passageways through the worktable support sections 208 for negative pressure to be applied to the glass holding conveyor belt 60 from the vacuum chamber volume 218.

Positively holding the glass sheet 44 against the glass holding conveyor belt 60 can allow for improved handling of the glass sheet 44, such as maintaining position of the glass sheet 44 on the glass holding conveyor belt 60 during relatively high conveyor belt accelerations and decelerations (e.g., at least about 2 m/s$^2$, such as at least about 5 m/s$^2$) in the machine direction and for relatively fast transfer rates of the glass sheets 44 onto the glass holding conveyor belt 60 (e.g., at least about 1 m/s) with relatively low takt time (e.g., about 3 to 7 seconds).

Referring again to FIG. 1, as indicated above, the glass sheet processing station 16 may be multi-gantry type that includes at least two gantry assemblies 64 and 66 that are arranged substantially parallel to each other, extending in the cross-machine direction between side edges 42 and 48 of the glass sheet 44. The gantry assemblies 64 and 66 may move independently along the glass sheet processing station 16 in the machine direction 32 along track assembly 122 using linear motors 115 and 117. Each gantry assembly 64 and 66 may include one or more processing heads 68 and 70 that are moveable linearly in the cross-machine direction 30 along track assemblies 126 and 136 provided by the gantry assemblies 64 and 66 and each include the respective laser cutting device that can be used to sever sections of the glass sheet 44 from another.

The glass sheet 44 may be transferred onto the glass holding conveyor belt 60 of the glass sheet processing station 16 for laser processing (e.g., cutting) of the glass sheet 44 using lasers of the processing heads 68 and 70. Generally, the laser processing may perforate the glass sheet 44 that is transparent to the laser, sometimes referred to herein as the "transparent material," and the perforation may cause or contribute to cutting the transparent material at the perforation. The laser processing may be used to separate portions of the glass sheet 44 to form a desired shape. The general mechanism of separating the substrate into individual parts is described below.

The separating method of the glass sheet processing apparatus 10 produces for each laser pulse a laser focal line (as distinct from a focal point) using laser optics suitable therefor (hereinafter also referred to as an optical arrangement). The focal line determines the zone of the interaction between the laser and the material of the glass sheet 44. If the focal line falls in the material to be separated, the laser parameters can be chosen such that an interaction with the material which produces a crack zone along the focal line takes place. Important laser parameters are the wavelength of the laser, the pulse duration of the laser, the pulse energy of the laser and possibly also the polarization of the laser. The following can be provided for the interaction of the laser light with the material:

1) The wavelength of the laser can be chosen such that the material of the glass sheet 44 is substantially transparent at this wavelength (specifically for example: absorption $<<10\%$ per mm of material depth $=>\gamma<<1/cm$; $\gamma$: Lambert-Beer absorption coefficient).

2) The pulse duration of the laser can be chosen such that no significant heat transport (heat diffusion) out of the zone of interaction can take place within the time of interaction (specifically for example: $\tau<<d^2/\alpha$, d: focus diameter, $\tau$: laser pulse duration, a: heat diffusion constant of the material).

3) The pulse energy of the laser can be chosen such that the intensity in the zone of interaction, that is to say in the focal line, produces an induced absorption, which leads to local heating of the material of the glass sheet 44 along the focal line, which in turn leads to crack formation along the focal line as a result of the thermal stress introduced into the material.

4) The polarization of the laser influences both the interaction at the surface (reflectivity) of the glass sheet 44 and the type of interaction within the material in the induced absorption. The induced absorption may take place by way of induced, free charge carriers (typically electrons), either after thermal excitation, or by way of multiphoton absorption and internal photoionization, or by way of direct field ionization (field strength of the light breaks electron bonding directly). The type of generation of the charge carriers can be assessed for example by way of the so-called Keldysh parameter. In the case of certain materials (for example birefringent materials) it may just be important that the further absorption/transmission of the laser light depends on the polarization, and consequently the polarization by way of suitable optics (phase plates) should be chosen by the user to be conducive for separating the respective material, for example simply in a heuristic way. Therefore, if the material is not optically isotropic, but for example birefringent, the propagation of the laser light in the material is also influenced by the polarization. Thus, the polarization and the orientation of the polarization vector may be chosen such that, as desired, there only forms one focal line and not two (ordinary and extraordinary rays). In the case of optically isotropic materials, this does not play any role.

5) Furthermore, the intensity should be chosen on the basis of the pulse duration, the pulse energy and the focal line diameter such that there is preferably no significant ablation or significant melting, but preferably only crack formation in the microstructure of the solid body. For typical materials such as glass or transparent crystals, this requirement can be satisfied most easily with pulsed lasers in the sub-nanosecond range, that is to say in particular with pulse durations of for example between 10 and 100 ps.

The process for the crack formation in the material occurring, and made to extend vertically to the plane of the glass sheet 44, is mechanical stress that exceeds the structural strength of the material (compressive strength in MPa). The mechanical stress is achieved here by way of rapid, inhomogeneous heating (thermally induced stress) by the laser energy. Presupposing appropriate positioning of the glass sheet 44 in relation to the focal line, the crack formation starts at the surface of the glass sheet 44, since that is where the deformation is greatest. The reason for this is that in the half-space above the surface there is no material that can absorb forces. This argument also applies to materials with hardened or toughened surfaces, as long as the thickness of the hardened or toughened layer is great in comparison with the diameter of the abruptly heated material along the focal line.

The type of interaction can be set by way of the fluence (energy density in Joules per $cm^2$) and the laser pulse duration with a selected focal line diameter such that, in some embodiments, 1.) no significant melting takes place at the surface or in the volume and 2.) no significant ablation with particle formation takes place at the surface. In the substantially transparent materials, several types of induced absorption are known:

a) In semiconductors and isolators with a low band gap, on the basis for example of a low residual absorption (due to traces of impurities in the material or due to charge carriers already thermally excited at the temperature before the laser machining), rapid heating up within a first fraction of the laser pulse duration will lead to thermal excitation of further charge carriers, which in turn leads to increased absorption and consequently to a cumulative increase in the laser absorption in the focal line.

b) In isolators, if there is sufficiently high light intensity, a photo absorption leads to an ionization on the basis of a nonlinear-optical interaction with the atoms of the material, and consequently in turn to the generation of free charge carriers, and consequently to increased linear absorption of the laser light.

The production of the geometry of a desired separating surface (relative movement between the laser beam of one of the processing heads 68 and 70 and the substrate of the glass holding conveyor belt 60 along a line on the substrate surface) is described below.

The interaction with the glass sheet 44 produces for each laser pulse an individual, continuous (seen in the direction perpendicular to the substrate surface) crack zone in the material along a focal line. For the complete severing of the material, a series of these crack zones for each laser pulse is set so close together along the desired separating line that a lateral connection of the cracks produces a desired crack surface/contour in the material. For this, the laser is pulsed at a specific repetition rate. The spot size and spacing are chosen such that a desired, directed crack formation occurs at the surface, along the line of the laser spots. The spacing of the individual crack zones along the desired separating surface is obtained from the movement of the focal line in relation to the material within the time period from laser pulse to laser pulse.

To produce the desired separating surface in the material of the glass sheet 44, the pulsed laser light is moved over the material by an optical arrangement that is movable parallel to the plane of the glass sheet 44 such that the desired separating line is formed. The orientation of the focal line in relation to the surface of the glass sheet 44, whether perpendicular or at an angle to the surface, may either be chosen as a fixed value or be changed by way of a pivotable optical arrangement (hereinafter also referred to for simplicity as optics) and/or a pivotable beam path of the laser along the desired separating line.

Altogether, for forming the desired separating line, the focal line may be passed through the material in up to five separately movable axes: two spatial axes (x, y), which fix the point of penetration of the focal line into the material, two angular axes (theta, phi), which fix the orientation of the focal line from the point of penetration into the material, and a further spatial axis (z', not necessarily orthogonal to x, y), which fixes how deep the focal line reaches into the material from the point of penetration at the surface.

There are generally restrictions here, dictated by the optics and the laser parameters: the orientation of the angles in theta and phi can only take place to the extent that the refraction of the laser light in the material allows (less than the angle of total reflection in the material), and the depth of penetration of the laser focal line is restricted by the available laser pulse energy and the accordingly chosen laser optics, which only forms a length of the focal line that can produce the crack zone with the laser pulse energy available.

The separation of the material along the crack surface/contour produced takes place either by internal stress of the material or by forces introduced, for example mechanically (tension) or thermally (uneven heating/cooling). Since, no significant amount of material may be ablated, there is generally initially no continuous gap in the material, but only a highly disturbed fracture surface area (microcracks), which is meshed within itself and under some circumstances still connected by bridges. The forces subsequently introduced have the effect of separating the remaining bridges and overcoming the meshing by way of lateral crack growth (taking place parallel to the plane of the substrate), so that the material can be separated along the separating surface.

Figure 8:
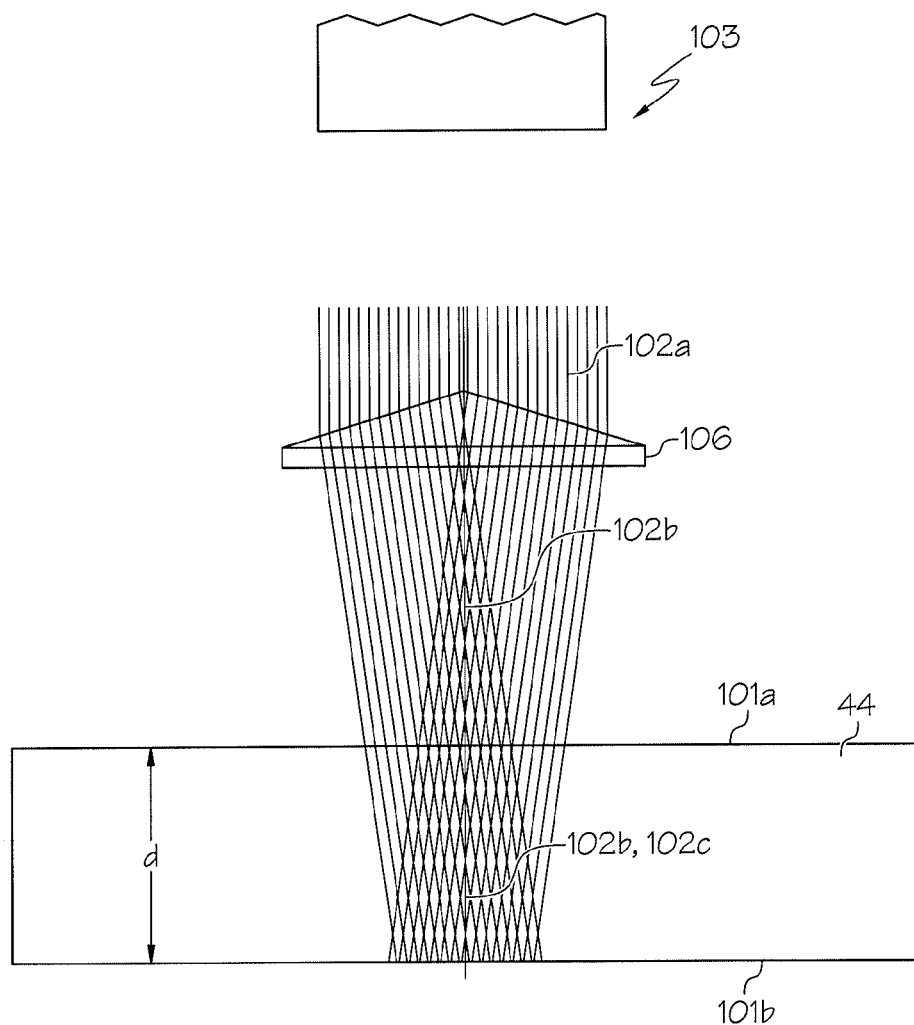
FIG. 8 illustrates an optical arrangement of a laser for use with the glass sheet processing apparatus of FIG. 1, according to one or more embodiments shown and described herein.

Referring to FIG. 8, a method for the laser-based machining of the glass sheet 44, in order to separate the substrate into multiple parts, in which the laser beam 102a, 102b of a laser 103 for machining the glass sheet 44 is directed onto the latter, is characterized in that with an optical arrangement 106 positioned in the path of rays of the laser 103, an extended laser beam focal line 102b, seen along the direction of the beam, is formed on the beam output side of the optical arrangement 106 from the laser beam 102a directed onto the latter, the glass sheet 44 being positioned in relation to the laser beam focal line 102b such that an induced absorption is produced in the material of the glass sheet 44 along an extended portion 102c, seen in the direction of the beam, of the laser beam focal line 102b, with the effect that an induced crack formation takes place in the material of the substrate along this extended portion 102c.

In some embodiments, the glass sheet 44 is positioned in relation to the laser beam focal line 102b such that the extended portion 102c of the induced absorption in the material, that is to say in the interior of the glass sheet 44, extends up to at least one of the two opposite substrate surfaces 101a, 101b.

In certain embodiments, the glass sheet 44 is positioned in relation to the laser beam focal line 102b such that the extended portion 102c of the induced absorption in the material, that is to say in the interior of the glass sheet 44, extends from one 101a of the two opposite substrate surfaces up to the other 101b of the two opposite substrate surfaces, that is to say over the entire layer thickness d of the glass sheet 44 or in that the glass sheet 44 is positioned in relation to the laser beam focal line 102b such that the extended portion 102c of the induced absorption in the material, that is to say in the interior of the glass sheet 44, extends from one 101a of the two opposite substrate surfaces into the glass sheet 44, but not up to the other 101b of the two opposite substrate surfaces, that is to say not over the entire layer thickness d of the glass sheet 44, preferably extends over 80% to 98%, preferably over 85 to 95%, particularly preferably over 90%, of this layer thickness.

In some embodiments, the induced absorption is produced such that the crack formation takes place in the microstructure of the glass sheet 44 without ablation and without melting of material of the glass sheet 44.

In certain embodiments, the extent of the laser beam focal line 102b and/or the extent of the portion 102c of the induced absorption in the glass sheet 44, that is to say in the interior of the glass sheet 44, seen in each case in the longitudinal direction of the beam, is between 0.1 mm and 100 mm, preferably between 0.3 mm and 10 mm, and/or in that the layer thickness d of the glass sheet 44, measured perpendicularly to the two opposite substrate surfaces 101a, 101b, is between 30 µm and 3000 µm, preferably between 100 µm and 1000 µm. In some embodiments, the average diameter 8 of the laser beam focal line 102b, that is to say the spot diameter, is between 0.5 µm and 5 µm, preferably between 1 µm and 3 µm, preferably is 2 µm, and/or in that the pulse duration t of the laser 103 is chosen such that, within the time of interaction with the material of the glass sheet 44, the heat diffusion in this material is negligible, preferably no heat diffusion takes place, for which preferably t, 8 and the heat diffusion constant $\alpha$ of the material of the glass sheet 44 are set according to $\tau \ll \delta^2/\alpha$ and/or preferably $\tau$ is chosen to be less than 10 ns, preferably less than 100 ps, and/or in that the pulse repetition rate of the laser 103 is between 10 kHz and 1000 kHz, preferably is 100 kHz, and/or in that the laser 103 is operated as a single-pulse laser or as a burst-pulse laser, and/or in that the average laser power, measured directly on the output side of the beam of the laser 103, is between 10 watts and 100 watts, preferably between 30 watts and 50 watts.

In certain embodiments, the wavelength $\lambda$ of the laser 103 is chosen such that the material of the glass sheet 44 is transparent to this wavelength or is substantially transparent, the latter being understood as meaning that the decrease in intensity of the laser beam taking place along the direction of the beam in the material of the glass sheet 44 per millimeter of the depth of penetration is 10% or less, the laser being, in particular for glasses or crystals that are transparent in the visible wavelength range as the glass sheet 44, preferably an Nd:YAG laser with a wavelength λ of 1064 nm or a Y:YAG laser with a wavelength λ of 1030 nm, or, in particular for semiconductor substrates that are transparent in the infrared wavelength range, preferably an Er:YAG laser with a wavelength λ of between 1.5 µm and 1.8 µm.

In some embodiments, the laser beam 102a, 102b is directed perpendicularly onto the glass sheet 44, in that therefore the glass sheet 44 is positioned in relation to the laser beam focal line 102b such that the induced absorption along the extended portion 102c of the laser beam focal line 102b takes place perpendicularly to the plane of the substrate or in that the laser beam 102a, 102b is directed onto the glass sheet 44 at an angle β of greater than 0° in relation to the normal to the plane of the glass sheet 44, in that therefore the glass sheet 44 is positioned in relation to the laser beam focal line 102b such that the induced absorption along the extended portion 102c of the laser beam focal line 102b takes place at the angle 90°-β to the plane of the substrate, where preferably β≤45°, preferably β≤30°.

Figure 9:
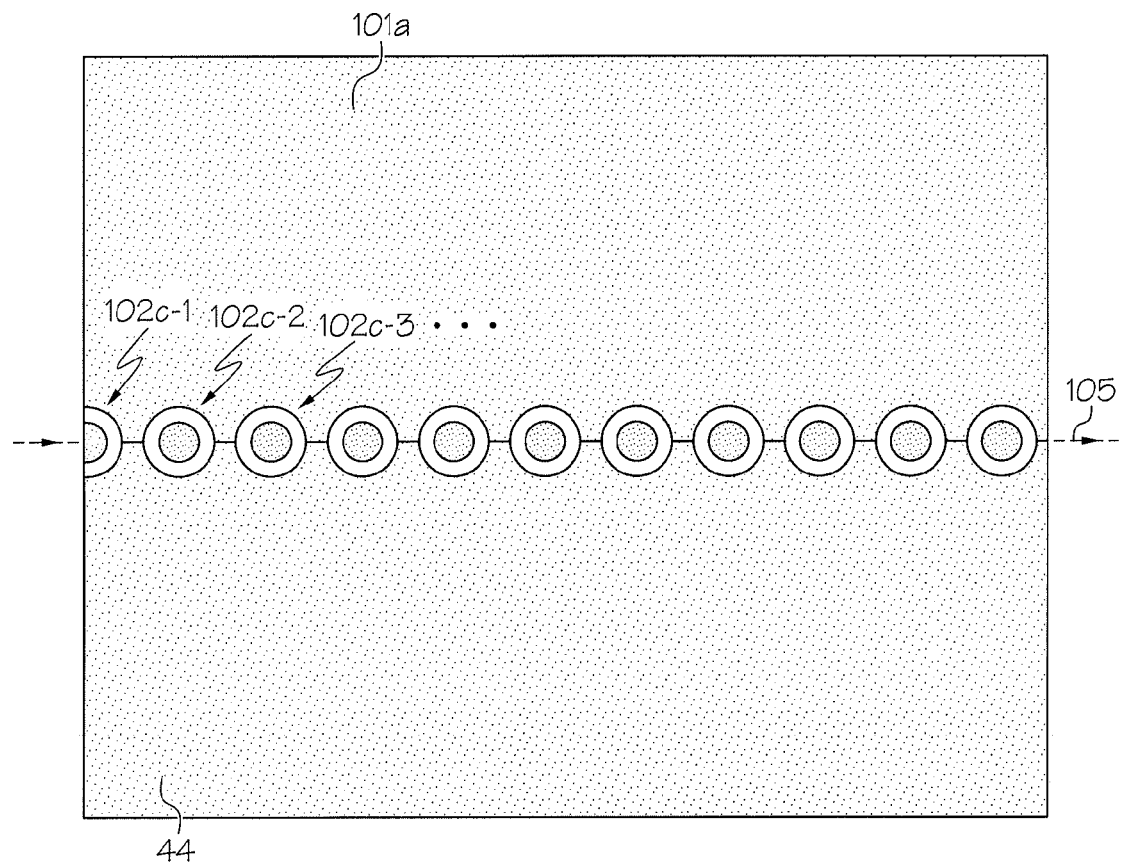
FIG. 9 represents a surface of a substrate machined using the glass sheet processing apparatus of FIG. 1.

Referring to FIG. 9, in certain embodiments, the laser beam 102a, 102b is moved in relation to the surface 101a of the glass sheet 44 along a line 105 along which the glass sheet 44 is to be severed to obtain the multiple parts, a multiplicity (102c-1, 102c-2, . . . ) of extended portions 102c of induced absorption in the interior of the glass sheet 44 being produced along this line 105, where preferably the ratio of the average spacing a of directly adjacent extended portions 102c of induced absorption, that is to say portions produced directly one after the other, and the average diameter 8 of the laser beam focal line 102b, that is to say the spot diameter, is between 0.5 and 3.0, preferably between 1.0 and 2.0.

In some embodiments, during and/or after the production of the multiplicity (102c-1, 102c-2, . . . ) of extended portions 102c of induced absorption in the interior of the glass sheet 44, mechanical forces are exerted on the glass sheet 44 and/or thermal stresses are introduced into the glass sheet 44, in particular the substrate is unevenly heated and cooled again, in order to bring about crack formation for separating the substrate into the multiple parts respectively between directly adjacent (102c-1, 102c-2) extended portions 102c of induced absorption, the thermal stresses preferably being introduced by irradiating the glass sheet 44 with a CO2 laser along the line 105.

Figure 10:
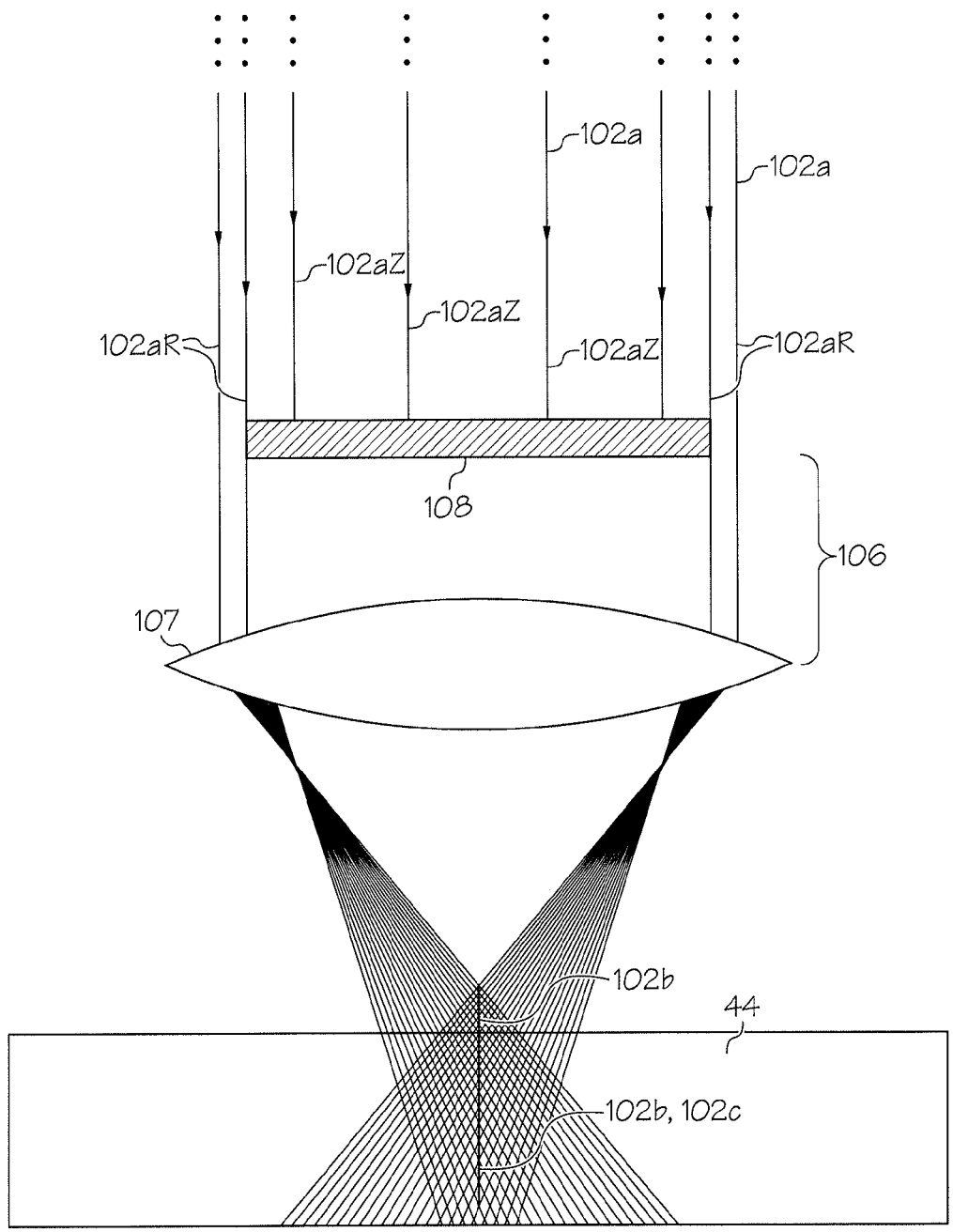
FIG. 10 illustrates another optical arrangement of a laser for use with the glass sheet processing apparatus of FIG. 1, according to one or more embodiments shown and described herein.

Referring to FIG. 10, a device for the laser-based machining of the glass sheet 44, in order to separate the substrate into multiple parts, with which the laser beam 102a, 102b of a laser 103 for machining the glass sheet 44 can be directed onto the latter, is characterized by an optical arrangement 106, which is positioned in the path of rays of the laser 103 and with which an extended laser beam focal line 102b, seen along the direction of the beam, can be formed on the beam output side of the optical arrangement 106 from the laser beam 102a directed onto the latter, the glass sheet 44 being able to be positioned or being positioned in relation to the laser beam focal line 102b such that an induced absorption takes place in the material of the glass sheet 44 along an extended portion 102c, seen in the direction of the beam, of the laser beam focal line 102b, with the effect that an induced crack formation is brought about in the material of the substrate along this extended portion 102c.

In certain embodiments, the optical arrangement 106 comprises a focusing optical element with spherical aberration, preferably a spherically ground convex lens 107, a diaphragm 108 of the optical arrangement 106, such as an annular diaphragm positioned before this focusing optical element 107 in the path of rays of the laser 103, with the effect that the bundle of rays (102aZ) lying at the center of the laser beam 102a impinging onto the diaphragm can be blocked out, so that only the peripheral rays (102aR) lying outside this center impinge onto this focusing optical element.

In some embodiments, the optical arrangement 106 comprises an optical element with a non-spherical free surface which is shaped for forming the laser beam focal line 102b with a defined extent, that is to say a defined length, seen in the direction of the beam, the optical element with the non-spherical free surface preferably being a cone prism or an axicon.

In certain embodiments, the optical arrangement 106 comprises in the path of rays of the laser 103 firstly a first optical element with a non-spherical free surface, which is shaped for the forming of the extended laser beam focal line 102b, preferably a cone prism or an axicon, and, on the beam output side of this first optical element, a second, focusing optical element, in particular a convex lens, these two optical elements being positioned and aligned such that the first optical element projects the laser radiation impinging on it annularly onto the second optical element, so that the extended laser beam focal line is produced on the beam output side of the second optical element.

In some embodiments, a third, focusing optical element, which is in particular a plano-convex collimation lens, is positioned between the first and second optical elements in the path of rays of the laser 103, the third optical element preferably being positioned and aligned such that the laser radiation formed annularly by the first optical element falls onto the third optical element with a defined average ring diameter and in that the third optical element projects the laser radiation annularly with this ring diameter and with a defined ring width onto the second optical element.

The methods or devices described above can be used for separating substrates of glass (e.g., having a thickness of about 0.7 mm or less), in particular of quartz, borosilicate, sapphire or soda-lime glass, sodium-containing glass, hardened glass or unhardened glass, of crystalline $Al_2O_3$, of $SiO_2 \cdot nH_2O$ (opal) or of a semiconductor material, in particular Si, GaAs, GaN, separating single- or multi-layered substrates, in particular glass-glass composites, glass-film composites, glass-film-glass composites or glass-air-glass composites, separating coated substrates, in particular metal-coated sapphire wafers, silicon wafers provided with metal or metal-oxide layers or substrates coated with ITO or AlZnO, and/or completely severing a single- or multi-layered substrate or severing one or more, but not all of the layers of a multi-layered substrate.

The laser beam focal line produced by means of the optical arrangement described above is alternatively also referred to above and below for simplicity as the focal line of the laser beam. The glass sheet 44 is separated or individually separated into the multiple parts, seen in the plane of the glass sheet 44, by the crack formation (induced absorption along the focal line made to extend perpendicularly to the plane of the substrate). The crack formation consequently takes place perpendicularly to the plane of the glass sheet 44 into the glass sheet 44 or into the interior of the substrate (longitudinal crack formation). As already described, generally a multiplicity of individual laser beam focal lines are introduced into the glass sheet 44 along a line on the substrate surface, in order that the individual parts of the glass sheet 44 can be separated from one another. For this purpose, either the glass sheet 44 may be made to move parallel to the plane of the glass sheet 44 in relation to the laser beam or in relation to the optical arrangement or, conversely, the optical arrangement may be moved parallel to the plane of the glass sheet 44 in relation to the glass sheet 44.

Example

Suitable, for example, for severing flat glasses is a commercially available picosecond laser 103, which has the following parameters: wavelength 1064 nm, pulse duration of 10 picoseconds, pulse repetition rate of 100 kHz, average power (measured directly after the laser) of up to 50 W. The laser beam initially has a beam diameter (measured at 13% of the peak intensity, i.e. $1/e^2$ diameter of a Gaussian bundle of rays) of about 2 mm, the beam quality is at least $M^2<1.2$ (determined in accordance with DIN/ISO 11146). With beam expanding optics (commercially available Kepler beam telescope), the beam diameter is increased by a factor of 10 to about 20-22 mm (21, 23, 24 and 25 are beam-deflecting mirrors). With a so-called annular diaphragm 8 of 9 mm in diameter, the inner part of the bundle of rays is cut off, so that an annular beam forms. With this annular beam, a plano-convex lens with a 28 mm focal length (quartz glass with a radius of 13 mm) is illuminated for example. The strong (desired) spherical aberration of the lens has the effect of producing the focal line.

Figure 11:
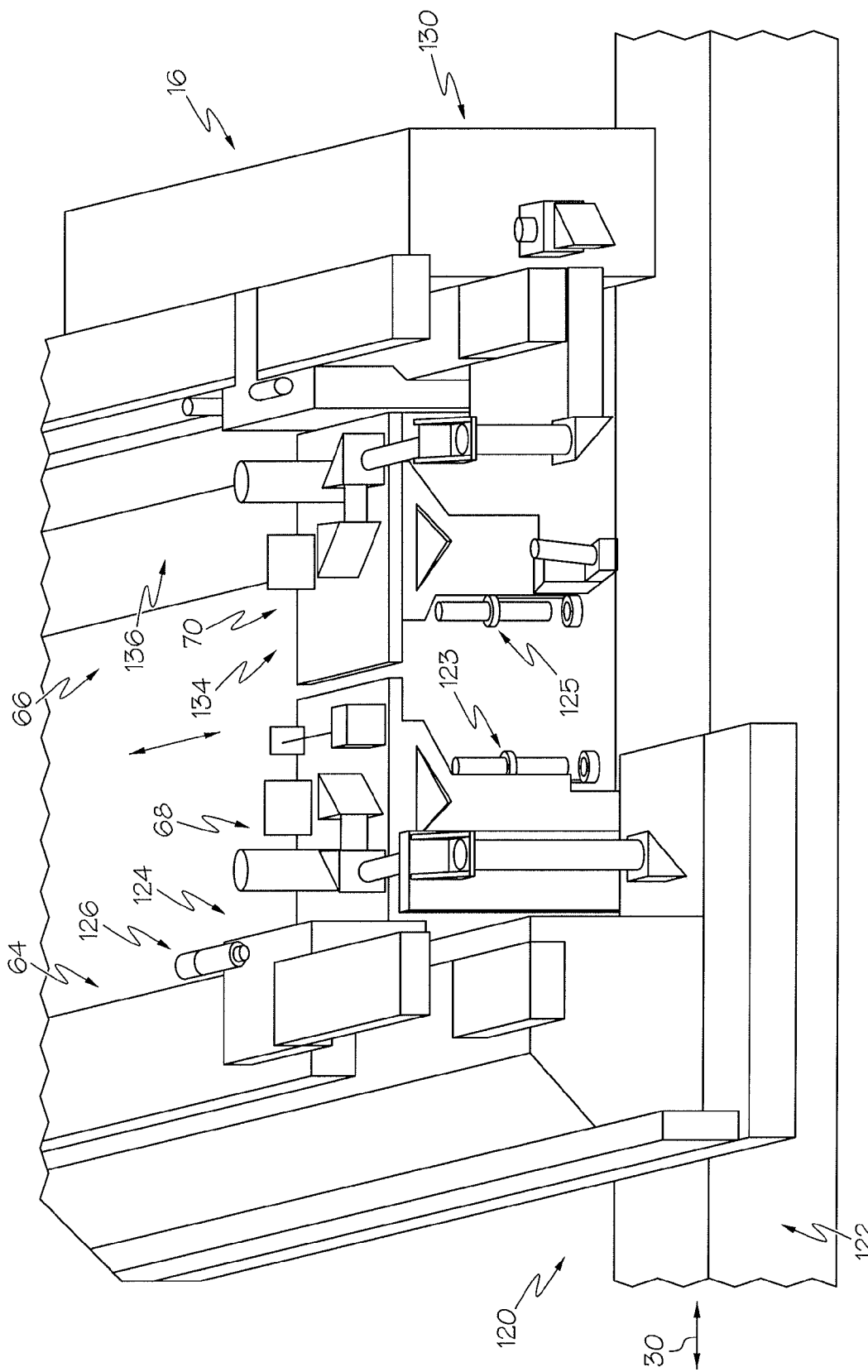
FIG. 11 illustrates a multi-gantry assembly for use with the glass sheet processing apparatus of FIG. 1, according to one or more embodiments shown and described herein.

Referring to FIG. 11, the first gantry assembly 64 and the second gantry assembly 66 are illustrated. One or both of the gantry assemblies 64 and 66 may include a laser cutting assembly 123, 125 that is suitable for use in severing the glass sheet 44, such as described above, as an example. The first gantry assembly 64 includes a base assembly 120 that is slidably connected to the track assembly 122 extending alongside the glass sheet processing station 16. The track assembly 122 allows linear movement of the first gantry assembly 64 in the machine direction 32. A processing head support assembly 124 is supported by the base assembly 120. The processing head support assembly 124 provides the track assembly 126 that allows linear movement of the processing head 68 in the cross-machine direction 30 using a linear actuator. Thus, with the machine direction track assembly 122 and the cross-machine direction track assembly 126, positioning of the processing head 68 and associated laser cutting assembly 123 anywhere in an X-Y plane can be achieved.

The second gantry assembly 66 includes a base assembly 130 (a base plate of the base assembly is removed for illustration) that is slidably connected to the track assembly 122 extending alongside the glass sheet processing station 16. The track assembly 122 allows linear movement of the second gantry assembly 66 in the machine direction 32. A processing head support assembly 134 is supported by the base assembly 130. The processing head support assembly 134 provides a track assembly 136 that allows linear movement of the processing head 70 in the cross-machine direction 30 using a linear actuator. Thus, with the machine direction track assembly 132 and the cross-machine direction track assembly 136, positioning of the processing head 70 and associated laser cutting assembly 125 anywhere in an X-Y plane can be achieved.

Figure 12:
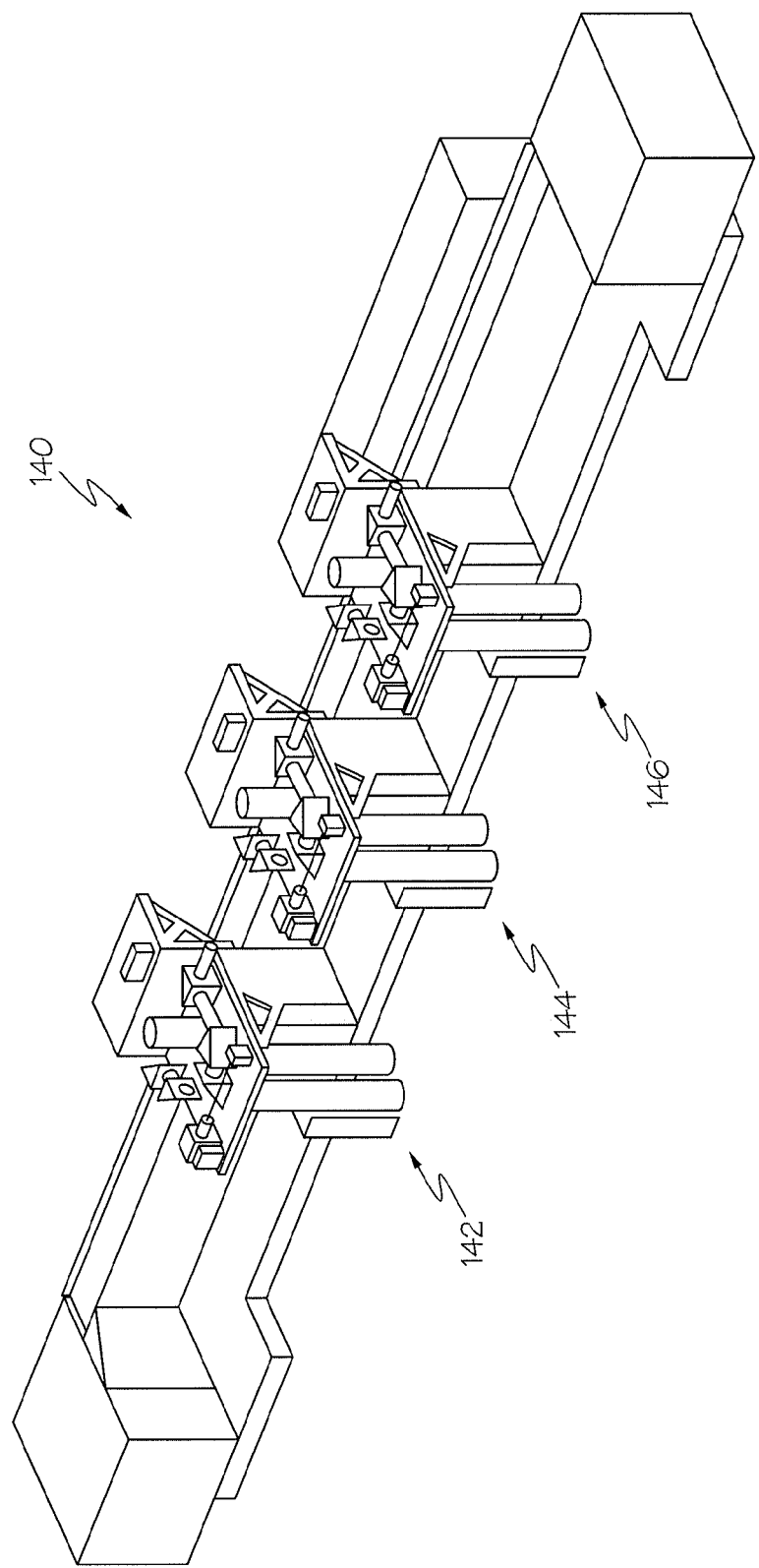
FIG. 12 illustrates a gantry assembly including multiple processing heads, according to one or more embodiments shown and described herein.

While a gantry assembly embodiment is illustrated by FIG. 11 that includes a single processing head (one for each gantry assembly), in some embodiments, a gantry assembly 140 may include more than one processing heads 142, 144 and 146, all provided on the same gantry assembly 140 as shown by FIG. 12. As above, any one or more of the processing heads 142, 144 and 146 may include a laser cutting assembly used in severing the glass sheet 44. While any one or more of the processing heads 142, 144 and 146 may include the laser cutting assemblies, they may include other tools for processes other than substrate separation, such as sprayers for dies and coatings, cleaning nozzles and other processing tools. The additional processing heads 142, 144 and 146 can allow for machining of additional parts from the same or multiple glass sheets 14. The parts may be substantially the same or they may be different. The multiple processing heads 142, 144, 146 may utilize their own linear actuator to allow for independent control of the processing heads 142, 144, 146. Laser beam splitting may be employed to provide a laser beam to the optics of different processing heads simultaneously.

Figure 13:
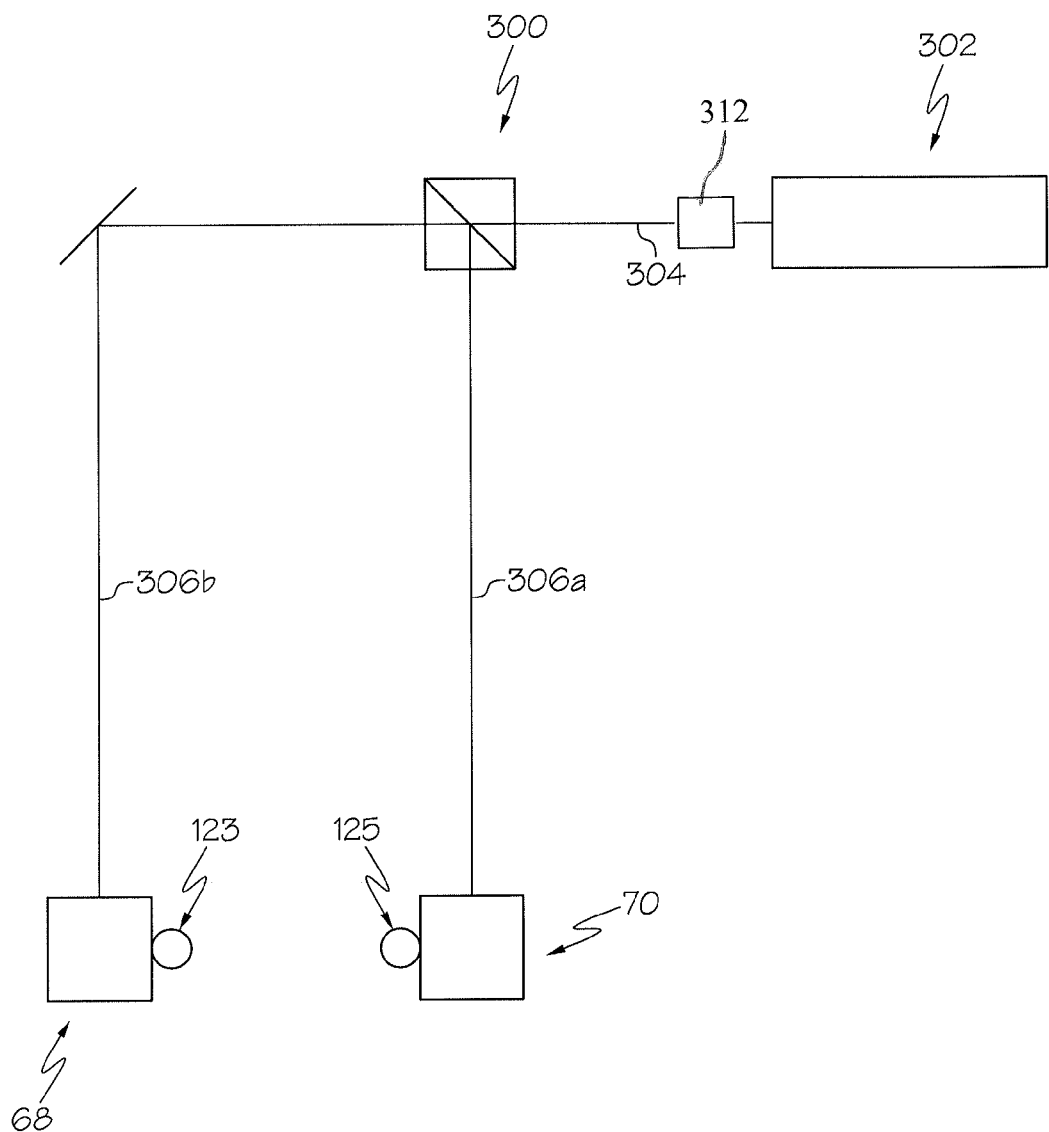
FIG. 13 is a schematic illustration of a beam splitting arrangement for the glass sheet processing apparatus of FIG. 1, according to one or more embodiments shown and described herein.

Referring briefly to FIG. 13, for example, a beam splitting device 300 may be located in a laser beam path of a laser source 302. The beam splitting device 300 may include an optical arrangement that is suitable to split an initial laser beam 304 provided by the laser source 302 into two separate laser beams 306a and 306b. Each laser beam 306a and 306b may be delivered to a respective processing head and laser cutting assembly, such as the processing heads 68 and 70 and laser cutting assemblies 123 and 125. In some embodiments, the laser source 302 may utilize an optical arrangement 312 that alters an energy profile of the laser beam 304 that can be useful in perforating the glass sheets and can be split into multiple laser beams 306a and 306b. In some embodiments, the optical arrangement 312 may include a waxicon optical arrangement that is used to alter the energy profile of the laser beam 304. Such an optical arrangement can reduce costs and complexity associated with multiple laser sources to generate the separate laser beams 306a and 306b.

Figure 14:
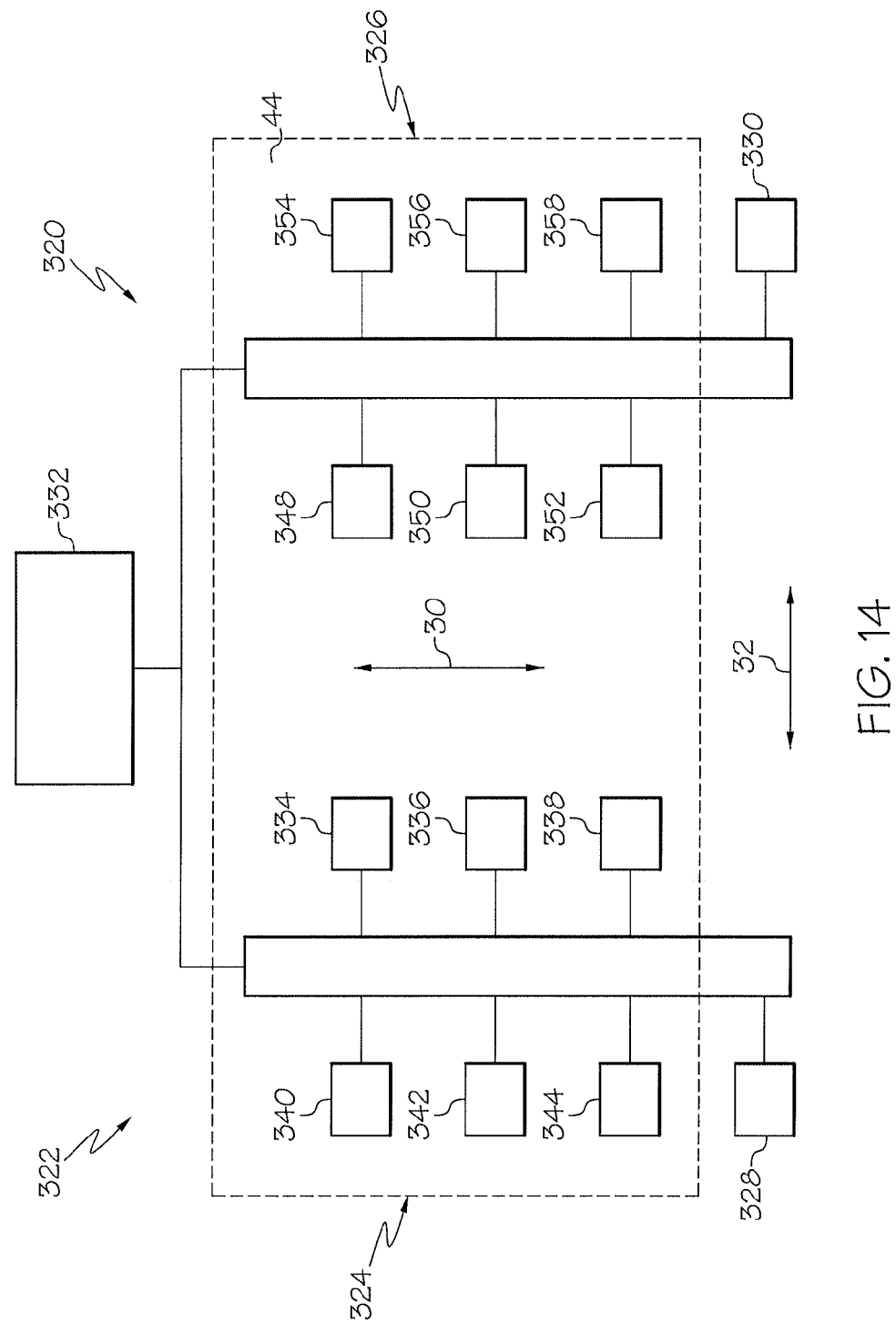
FIG. 14 illustrates a glass waste processing apparatus for use with the glass sheet processing apparatus of FIG. 1, according to one or more embodiments shown and described herein.

Referring, for example, to FIG. 14, a diagrammatic illustration of a substrate processing station 320 for use with the glass sheet processing apparatus 10 of FIG. 1 includes a multi-gantry processing apparatus 322. The multi-gantry processing apparatus 322 includes a first gantry assembly 324 and a second gantry assembly 326 with each first and second gantry assembly 324 and 326 extending across the glass sheet 44 in the cross-machine direction 30. As above, the first gantry assembly 324 may have a linear motor 328 operatively connected thereto for effectuating movement of the first gantry assembly 324 in the machine direction 32. Likewise, the second gantry assembly 326 may also include a linear motor 330 operatively connected thereto for effectuating movement of the second gantry assembly 326 in the machine direction 32. A controller 332 may include logic that controls simultaneous movement or otherwise of the first gantry assembly 324 and the second gantry assembly 326 in a cooperative manner.

The first gantry assembly 324 may include multiple processing heads 334, 336 and 338. Each processing head 334, 336 and 338 may have a linear motor 340, 342 and 344 operatively connected thereto for effectuating movement of the processing heads 334, 336 and 338 in the cross-machine direction 30 along a length of the first gantry assembly 324. Likewise, the second gantry assembly 326 may include multiple processing heads 348, 350 and 352. Each processing head 348, 350 and 352 may have a linear motor 354, 356 and 358 operatively connected thereto for effectuating movement of the processing heads 348, 350 and 352 in the cross-machine direction 30 along a length of the second gantry assembly 226. The controller 332 may include logic that control simultaneous movement or otherwise of the processing heads 334, 336, 338, 348, 350 and 352 in a cooperative manner.

Such a multi-gantry processing apparatus can allow for machining of portions of a single glass sheet 44 simultaneously or for simultaneous machining of multiple glass sheets 44 as the same or different processes. For example, the multiple gantry assemblies 324 and 326 with their associated multiple processing heads 334, 336, 338, 348, 350 and 352 can allow for machining of multiple, discreet sections simultaneously or otherwise in a split pattern process, which can reduce cutting time associate with machining multiple parts from glass sheets. In some embodiments, the laser cutting assemblies may each be configured to provide multiple laser beams that can be used to form desired part shapes. Glass sheets up to 5000 mm×5000 mm, such as between about 100 mm×100 mm to about 5000 mm×5000 mm and between about 25 µm and about 10 mm in thickness may be machined.

Figure 15:
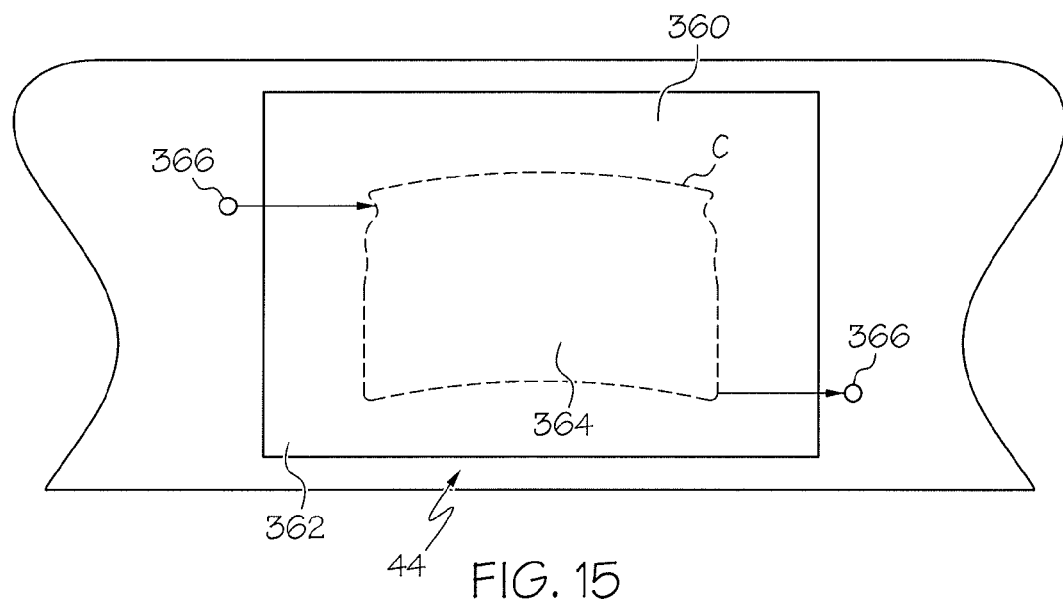
FIG. 15 is a schematic illustration of a glass cutting process, according to one or more embodiments shown and described herein.

Referring now to FIG. 15, a glass sheet cutting process is illustrated where outer sections 360 and 362 of the glass sheet 44 are separated from an inner section 364 of the glass sheet 44. In this example, the outer sections 360 and 362 may be considered scrap and the inner section 364 may be a quality part that is formed by severing the glass sheet 44, ultimately forming three disconnected sections 360, 362 and 364. A laser beam 366 provided by one of the laser cutting assemblies and associated processing heads described above may initiate the cutting operation at a location spaced away from the glass sheet 44 with the glass sheet being held flat against the glass holding conveyor belt 60 using negative pressure as described above. Because the laser beam 366 initiates a cutting path, which is represented by dashed lines C, at a location spaced from the glass sheet 44, the laser beam 366 is directed onto an upper conveyor belt surface 368 before being directed onto the glass sheet 44 and following the cutting path C.

Figure 16:
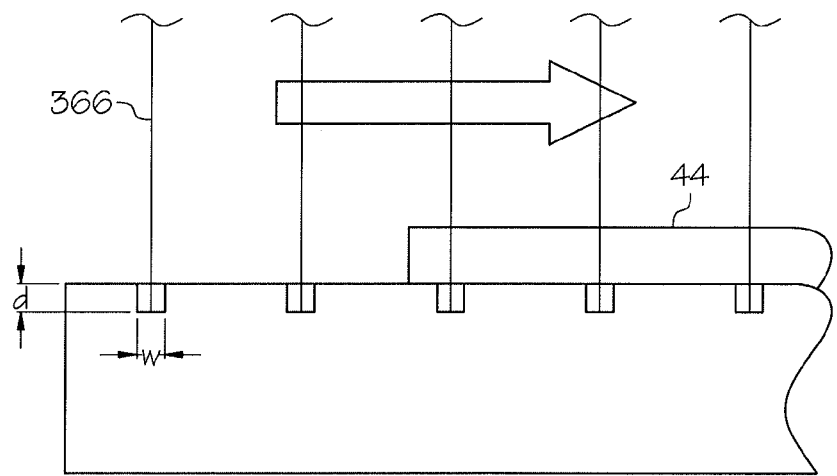
FIG. 16 is another schematic illustration of the glass cutting process of FIG. 15.

Referring to FIG. 16, the laser cutting assembly provides a succession of laser beams 366 that directly impact the glass holding conveyor belt 60 as the laser cutting assembly moves toward the glass sheet 44. As discussed above, the glass holding conveyor belt 60 may be formed of POM C, which is suitable to contact the glass sheets 44 and has a thermal resistance that can reduce alteration of the glass holding conveyor belt 60 during the laser cutting process. As one example, the laser beam 366, such as that provided by the laser described in the Example above, may create a recess 372 in the glass holding conveyor belt 60 that is no greater than about 300 microns in depth d and no greater than about 300 microns in width w. Such an arrangement can allow the glass holding conveyor belt 60 to be reused repeatedly for multiple glass sheets 44 without any need to replace portions of the glass holding conveyor belt 60.

Referring back to FIG. 1, the glass sheet processing apparatus 10 may include a glass unloading station 150 where desired glass parts formed from the glass sheets 44 may be removed from the glass holding conveyor belt 60. The glass parts may be removed manually or automatically, for example, by a robot, leaving glass scrap on the glass holding conveyor belt 60. The glass scrap may then be conveyed on the glass holding conveyor belt 60 to the glass waste disposal station 18.

Figure 17:
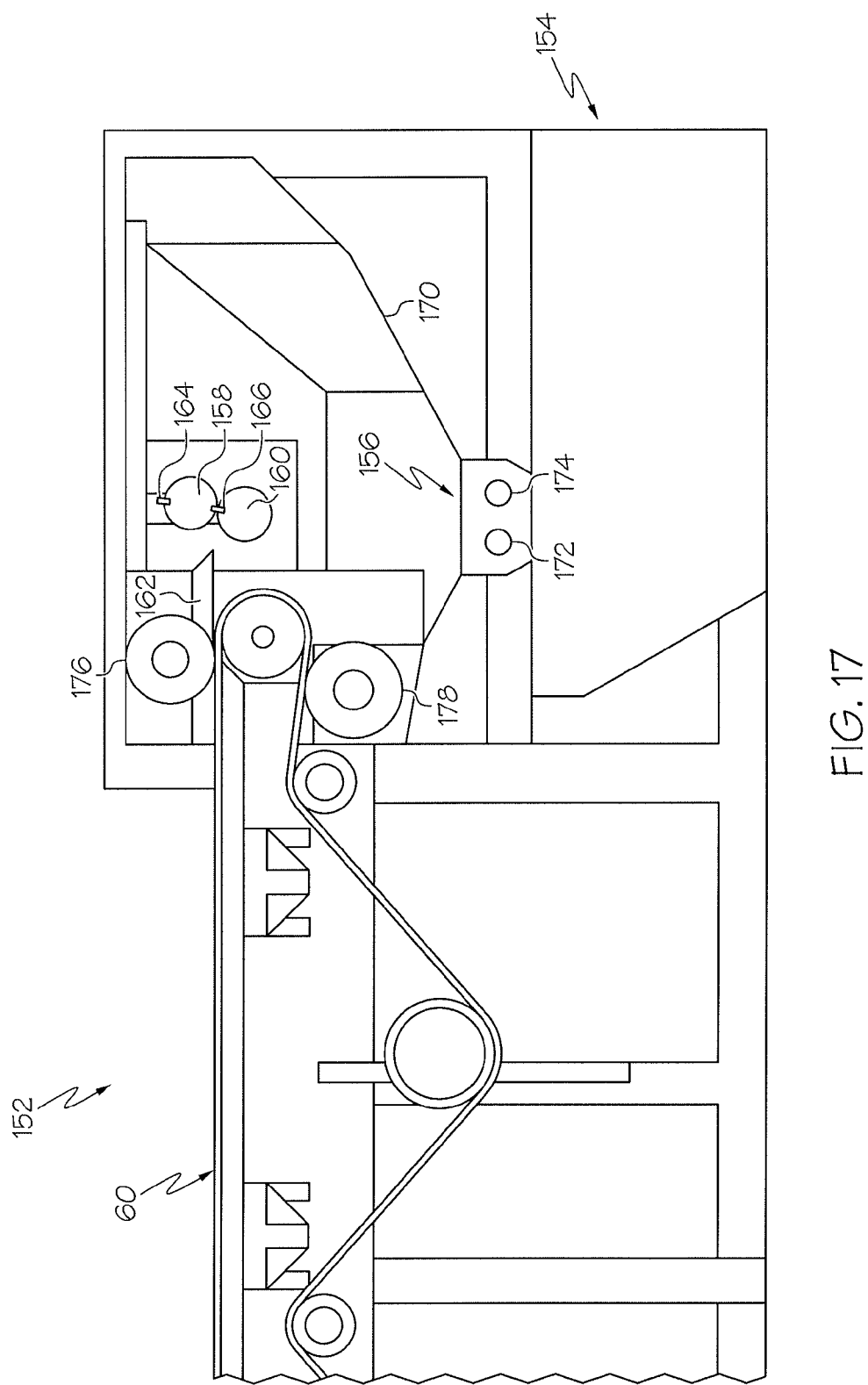
FIG. 17 illustrates a glass waste processing apparatus for use with the glass sheet processing apparatus of FIG. 1, according to one or more embodiments shown and described herein.

Referring to FIG. 17, the glass waste disposal station 18 includes a glass waste processing apparatus 152 that can further break down the glass waste into smaller sizes for depositing into a holding location 154 (e.g., a bin). The glass waste processing apparatus 152 includes a first glass breaking assembly 155 and a second glass breaking assembly 156. The first glass breaking assembly 155 includes a first break roller 158 and a second break roller 160 that receive glass waste 162 from the glass holding conveyor belt 60. In the illustrated example, the first break roller 158 includes a pair of blades 164 and 166 that engage and break the glass waste 162 (e.g., every 180 degrees of rotation) against the second break roller 160 in a cross-machine direction break. A brush roller 176 may be provided to dampen the shock of the first glass breaking assembly 155 on the glass waste 162 and also to inhibit or shield the belt surface from broken glass particles. Another brush roller 178 may be provided to clean the surface of the glass holding conveyor belt 60. The broken glass waste 168 may then slide down a ramp structure 170 toward the second glass breaking assembly 156. The second glass breaking assembly 156 may include a first break roller 172 and a second break roller 174. The first and second break rollers 172 and 174 may include saw-like teeth that further break the broken glass waste 168 in the machine direction. The broken glass waste 168 may then be deposited in the holding location 154.

Handling of glass-like substrates can be awkward and complex in terms of retaining flatness and stability during and after parts separation. The above-described glass sheet processing apparatus can provide a glass holding conveyor belt that can hold the substrate thereagainst by applying a vacuum force against the substrate that does not interfere with cutting processes or substrate quality. The glass sheet processing station uses a glass holding conveyor belt that can be used to carry multiple glass sheets to the laser cutting apparatus for multiple cutting and severing operations in a repeated fashion (i.e., one after another) with minimal, micron-sized affect on the surface of the glass holding conveyor belt. The glass sheet loading station may be provided that includes a tiltable table support body that can transfer the substrate to the glass holding conveyor belt by relatively small, individual belts, since the substrate is not yet separated. The glass sheet centering station may be provided that can align the substrate to an XY orientation for proper processing positioning. A glass waste disposal station may be provided that can further reduce the size of the waste removed from the parts.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A method for laser-based machining of a sheet-like substrate, in order to separate the substrate into multiple portions, in which a laser beam of a laser for machining the substrate is directed onto the substrate, the method comprising:

processing the sheet-like substrate using a first gantry assembly that extends across the sheet-like substrate in a cross-machine direction, the first gantry assembly comprising a first processing head and a second processing head, which move along a length of the first gantry assembly, and comprising a laser that provides a laser beam, the laser comprising an optical arrangement that is positioned in a beam path of the laser beam and that splits the laser beam into a first laser beam provided to the first processing head and a second laser beam provided to the second processing head, the first laser beam and the second laser beam each providing a laser beam focal line that is formed on a beam output side of the optical arrangement, the optical arrangement comprising a first focusing optical element and a second focusing optical element spaced apart from the first focusing optical element, the first focusing optical element and the second focusing optical element generating the laser beam focal line, of the first laser beam and of the second laser beam, on a beam output side of the second focusing optical element, and the optical arrangement further comprising a third focusing optical element positioned between the first focusing optical element and the second focusing optical element along the beam path of the laser beam; and processing the sheet-like substrate using a second gantry assembly that extends across the sheet-like substrate in the cross-machine direction, the second gantry assembly comprising a third processing head that moves along a length of the second gantry assembly.

2. The method of claim 1, further comprising moving the first gantry assembly in the cross-machine direction using a first linear actuator operatively connected to the first gantry assembly.

3. The method of claim 1, further comprising moving the second gantry assembly in the cross-machine direction using a second linear actuator operatively connected to the second gantry assembly.

4. The method of claim 1, wherein the third processing head of the second gantry assembly comprises a processing tool that is different from the laser of the first processing head and of the second processing head of the first gantry assembly.

5. The method of claim 1, wherein the third processing head of the second gantry assembly comprises a laser comprising a second optical arrangement positioned in a beam path of the laser providing a laser beam focal line that is formed on a beam output side of the second optical arrangement.

6. The method of claim 1, further comprising controlling movement of the processing heads of the first gantry assembly and the second gantry assembly using a controller.

7. The method of claim 1, wherein the second gantry assembly comprises multiple processing heads, each processing head of the second gantry assembly moving along a length of the second gantry assembly in the cross-machine direction.

8. The method of claim 1, further comprising altering an energy profile of the laser beam provided by the laser using a waxicon optical arrangement.

9. The method of claim 1, further comprising a glass holding conveyor belt carrying the sheet-like substrate so that each laser beam focal line is positioned on the sheet-like substrate with the sheet-like substrate on the glass holding conveyor belt.

10. The method of claim 1, wherein the first focusing optical element is an axicon and the second focusing optical element is a convex lens.

11. The method of claim 10, wherein the third focusing optical element is a plano-convex collimation lens.

12. The method of claim 1, wherein the processing head of the second gantry assembly comprises a sprayer or a cleaning nozzle.

13. The method of claim 1, further comprising forming a fracture surface area in the substrate with the laser beam focal line.

* * * * *